United States Patent
Jin et al.

(10) Patent No.: US 7,088,243 B2
(45) Date of Patent: Aug. 8, 2006

(54) METHOD OF INTRUDER DETECTION AND DEVICE THEREOF

(75) Inventors: Mun Wang Jin, Seoul (KR); Lee Yong Jin, Seoul (KR); Alexander B. Murynin, Moscow (RU); Victor D. Kuznetsov, Moscow (RU); Peter A. Ivanov, Moscow (RU); Il-Jun Jeong, Seoul (KR)

(73) Assignee: S1 Corporation, Seoul (KR)

( * ) Notice: Subject to any disclaimer, the term of this patent is extended or adjusted under 35 U.S.C. 154(b) by 92 days.

(21) Appl. No.: 10/814,497

(22) Filed: Mar. 30, 2004

(65) Prior Publication Data

US 2004/0239761 A1    Dec. 2, 2004

(30) Foreign Application Priority Data

May 26, 2003    (RU)    .............................. 2003115358

(51) Int. Cl.
*G08B 13/00*    (2006.01)
(52) U.S. Cl. ...................... 340/541; 340/552; 340/555; 340/557; 342/27; 382/107; 382/118
(58) Field of Classification Search .............. 340/541, 340/552, 557, 573.1, 573.4, 573.6, 5.62, 340/10.5; 342/27; 382/104
See application file for complete search history.

(56) References Cited

U.S. PATENT DOCUMENTS

| 4,364,030 A | | 12/1982 | Rossin ...................... 340/567 |
| 5,182,776 A | * | 1/1993 | Suzuki et al. ............... 382/100 |
| 5,874,996 A | * | 2/1999 | Shimokoriyama et al. ..................... 375/240.02 |
| 5,910,767 A | | 6/1999 | Frucht ......................... 340/557 |
| 5,956,424 A | * | 9/1999 | Wootton et al. ............ 382/192 |
| 6,496,220 B1 | * | 12/2002 | Landert et al. ............. 348/143 |
| 6,538,689 B1 | * | 3/2003 | Chang ......................... 348/159 |
| 6,914,526 B1 | * | 7/2005 | Wallace et al. ............. 340/541 |
| 6,937,651 B1 | * | 8/2005 | Brill et al. ................... 375/240 |

FOREIGN PATENT DOCUMENTS

RU    2 093 890    10/1997

* cited by examiner

*Primary Examiner*—Davetta W. Goins
(74) *Attorney, Agent, or Firm*—Ladas & Parry LLP

(57) ABSTRACT

Disclosed is a method of intruder's detection, comprising of using of more than 1 sensor, represented, for example, by video cameras that are arranged with fixed spatial orientation for stereo detector formation at that 2D distributions of light intensity that form stereo images registered by stereo detector are transmitting to blocks of processing, for example, blocks of digital processing at that mentioned blocks of digital processing perform processing of sequence of stereo images with different frequencies (high and low), to determine the presence of intruder, it's position and speed of transference.

14 Claims, 4 Drawing Sheets

Front View

METHOD OF INTRUDER DETECTION AND DEVICE THEREOF

BACKGROUND OF THE INVENTION (a) Field of the Invention

The present invention relates to the security systems and, in particular, it concerns a system that observes the surveillance zone with stereo camera and analyses if there is an intruder or not in the area (b) Description of the Related Art The modern level of technology makes it possible to develop intellectual security systems to make business and private life more safe and convenient. Intruder detector is an automatic system that detects intrusion of any human body into surveillance zone. Surveillance zone is the area that must be protected with intruder detector, including offices, banks, private homes or any other buildings, any area that is not the open space. Since last years different technical solutions have been proposed for this area.

One example of an attempt to make a solution of this problem is the intruder detection system disclosed in U.S. Pat. No. 5,910,767. In this method the light beam from laser scans the surveillance zone and reflects from the target that might be the potential intruder and computer measures and analyzes the distance and intensity of the reflected light and sounds an alarm if detected person is an intruder. However, this method has several serious disadvantages. First, it uses intermediate optics (mirror, equipment for its rotation and so on) that can give a substantial part of error in intruder's detection and additional noise to the input scene. Indeed, usage of laser can occupy additional time to scan the surveillance area to receive data about all points of the scene and there are limits in spectral range based on chosen type of laser. Furthermore, price of some types of lasers can be very high and the spectral range can be not appropriate to work both under dark and with daylight illumination. Thus, the method of U.S. Pat. No. 5,910,767 is highly limited in potential applications.

Similarly, U.S. Pat. No. 4,364,030 discloses another intruder detection system. This system includes infrared sensor, optical system and electronic system for processing of image data. However, because of infrared sensor usage the level of false alarm for this system is much higher because of the reaction of sensor on the heat flows that can be not only from the human intruder.

Another example is disclosed in Pat. of Russian Federation No. 95115528/09. This method involves two-stage recognition. First stage includes matching personal code of person and password which he/she utters. Then device for scanning face according to person's height is loaded and face image is scanned and compared to stored data. If there is a correspondence between these characteristics the system detects the object. This system is the system of protection of the entering of surveillance zone from unauthorized access. However, this method has several big disadvantages. First, this method is non convenient for authorized user because he needs to remember the input data and to do something to enter the area. Also, this method permits only the entrance of the intruder but it cannot monitor the whole surveillance zone if there is an intruder. So because of those disadvantages it has serious limits in potential applications.

In general, there are a lot of different methods in the field of intruder's detection using different kinds of sensors and computer or processor for sensor's signal processing.

However, such a limitation implies to develop method that have both low price of the equipment and low level of false alarms and noise in input images. Such system can detect intruder more efficiently using stereo camera for observing the surveillance zone and special digital signal processor for images processing with high speed and good quality.

SUMMARY OF THE INVENTION

The present invention is of a method for detecting of the presence of intruder in the surveillance zone. Methods are disclosed for high performance intrusion detection by using of sensor for obtaining images to transmit image data to the processor to calculate optical flows for detection of moving intruders and 3D reconstruction for detection of static intruders combining with noise filtering. The sensor is, for example, stereo camera, that obtains and transmits image data to the processor. This processor is, for example, a digital signal processor, that performs analyzing and processing of image data that is transmitted from stereo camera. The disclosed method that consists in:

Using of at least 2 identical sensors, for example, video cameras, that are spatially carried with predetermined spatial orientation that are further called stereo camera. The 2D spatial distributions of light intensity from stereo cameras that are further called stereo images are periodically transferred to the processors, for example, digital signal processors, both with for high or low frequencies;

With high frequency—for detection of fast moving intruders,

Low frequency—for detection of slow moving intruders.

The processors, for example, digital signal processors, perform the detection of intruders and create the output signal if the intruder is detected. The output signal is transferred to the output device, for example, the alarm signaling device.

The detection of fast moving intruder is performed in fast motion detection processor, for example, digital signal processor, by comparing sequences of stereo images with high frequency.

The detection of slow moving intruder is performed by slow motion detection processor by comparing current 3D depth distribution to the preliminary stored one.

Stereo images are processed both individually and in combination in order to distinguish intruder from shadows, flashes etc., i.e. if intruder is detected by fast motion detection processor, the detection should be confirmed by slow motion detection processor.

That there is carried out the comparison of 2 or more subsequent stereo images and is determined the measure of their difference, for example, by forming the 2D field of velocities, by fast motion detection processor.

In the case if the measure of difference found by fast motion detection processor is more than a predetermined value an area where such difference exists is remembered.

That there is analyzed the spatial distribution of determined measures of difference for each of stereo images by fast motion detection processor.

There is carried out comparison of marked changes on two or more stereo images by fast motion detection processor. By means of using of predetermined information about relative special position of stereo images, there is determined spatial location, geometrical size and distance to the possible intruder that is stimulated by above mentioned change of signal.

By means of comparison of 2D fields of velocities, as stated in claim 5, with predetermined showings there is determined whether given object can be intruder. The intruder is a human that enters the surveillance zone independently of its age, height, weight, sex, and position (whole intruder, lying or sitting intruder and so on).

In the case of positive determination of the intruder there is carried out more detailed measurement of object's elements location in space by means of finding of correspondent points on stereo images by slow motion detection processor that are obtained from 2 or more stereo images.

There is determined the 3D object's elements location in space by means of finding of correspondent points whereupon this location is compared with predetermined 3D distribution of background's elements for distinguishing of intruder from shadows, flashlights and headlights.

In the case if above mentioned difference of possible intruder's and background's location is more than some predetermined value there is generated an alarm signal that denotes the intruder's appearance.

If during the predetermined period of time there was no detection of fast moving intruder after a lapse of time there is carried out detailed determination of 3D element's disposition in the limits of the view field by slow motion detection processor and comparison with the background's distribution that was remembered in advance. It is necessary for detection of the intruder that is moving enough slow and that is not detected by means of realization of above mentioned operations because the difference between successive stereo images is insignificant.

There is carried out the comparison of the measured 3D distribution of elements with predetermined 3D background's distribution, in the case if this difference is more than some predetermined value there is determined the geometrical size and the possible intruder's shape in the zone of exposed changes.

These characteristics are compared with characteristics that are known in advance and in the case of correspondence of these characteristics to the possible characteristics of intruder there is generated an alarm signal about the possible presence of intruder.

Before the beginning of the area tracking by means of above mentioned operations there is carried out the measurement of scene's elements distribution in the surveillance zone by means of remembering of predetermined number of stereo images if there is no intruder and based on it measurement of elements of 3D distribution and averaging-out.

Before the beginning of the area tracking by means of above mentioned operations there is carried out the calibration of 2 or more sensors that consists in presentation of the object with known geometrical characteristics, carrying out measurements of those its characteristics, comparing with predetermined and insertion of corrections that are compensating errors in carried measurements. Such operation should be performed before carrying out of measurements in the case of change of geometrical relative special position of sensors or substitution of at least one of sensors.

Usage of such method for detection of objects in stereo images is important for a number of reasons. First, by comparing points on left and right stereo images the processor, for example, digital signal processor, improves the work of method because it can reject the false points that might be found on one of stereo images in case of using of mono detector and correspondingly increases the SNR (signal to noise ratio) and decreases the level of false alarms.

Another reason why usage of such method is important is that there are two different methods for detection of intruder that are combined into one. The detection of moving intruder is performed by the processor, for example, digital signal processor, by calculation of optical flows—the speed of every point of object if it is moving. Such kind of detection is performed with very high speed. If the intruder is not moving in the surveillance zone, the processor, for example, digital signal processor performs 3D reconstruction of static object to detect intruder. Processor, for example, digital signal processor, creates a map of points from stereo images that have a correspondence between each other. The disparity is calculated as a distance difference between corresponding points. Calculation of disparity makes it possible to determine the distance between appropriate camera (left and right) and the point on 3D object (static intruder). This detection requires lots of calculation resources and because of that it is performed with slow speed. The processor, for example, digital signal processor, performs this combined method that contains these two parts and realizes fast detection of moving intruder method every time and slow static intruder detection method at each test time (for example, 3 seconds). Because of that the total speed of combined method is high and stereo intruder detector can observe the surveillance zone for detection of intruder very fast.

One more reason why this method is important is the possibility for stereo intruder detector to observe the lengthy area and process all points in it for a short time. It is possible because it consists of stereo camera that can observe such area and of high speed processor, for example, digital signal processor, to make processing.

Finally, in preferred embodiments of the present invention, stereo intruder detector's precision of intruder's detection is very high because of the processor, for example, digital signal processor, that performs the adjustment that performs compensation of the distortions of right and left lenses of the device, for example, stereo camera, and by that improves the precision.

Hereinafter, the term "video stream" is defined as sequence of 2D images that are following one after another with determined speed and order.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
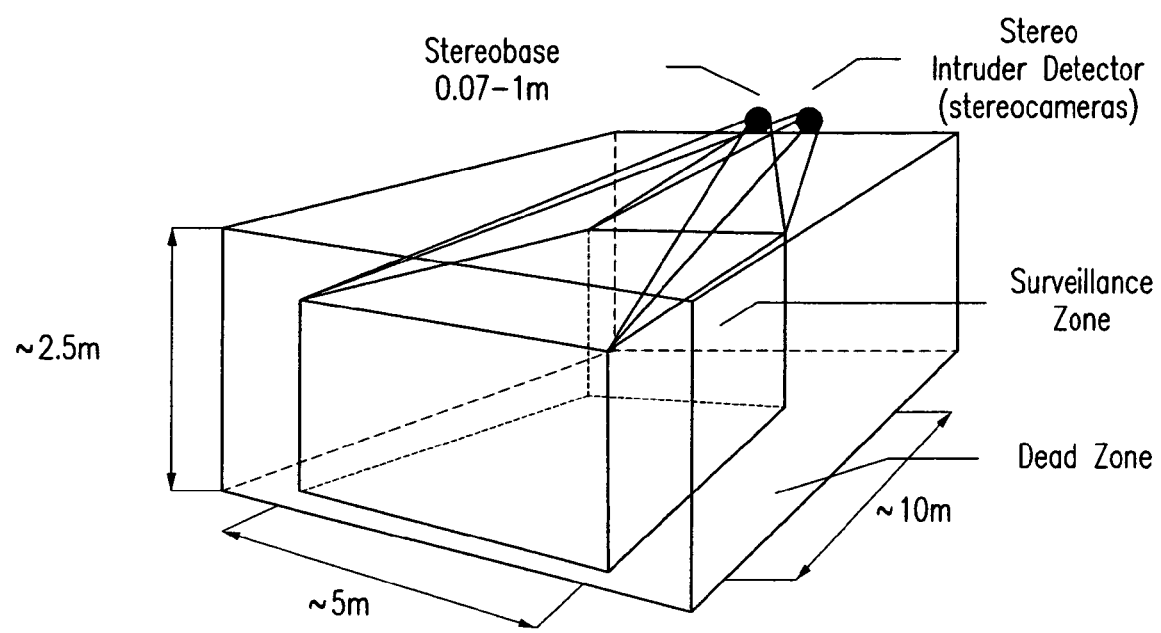
FIG. 1 illustrates an example of Stereo Intruder Detector's displacement in the surveillance zone.

The invention is herein described, by way of example only, with reference to the accompanying drawings, wherein:

FIG. 1 illustrates an example of Stereo Intruder Detector's displacement in the surveillance zone.

The present invention is of stereo intruder detector that performs the detection of intruders that entering the surveillance zone. The example of system's displacement is presented on FIG. 1. According to FIG. 1 stereo intruder detector takes up the position near the ceiling of the enclosed space at the height up to 2.5 m and performs the detection of intruder in the surveillance zone that has geometrical size up to 5×10 m.

Figure 2:
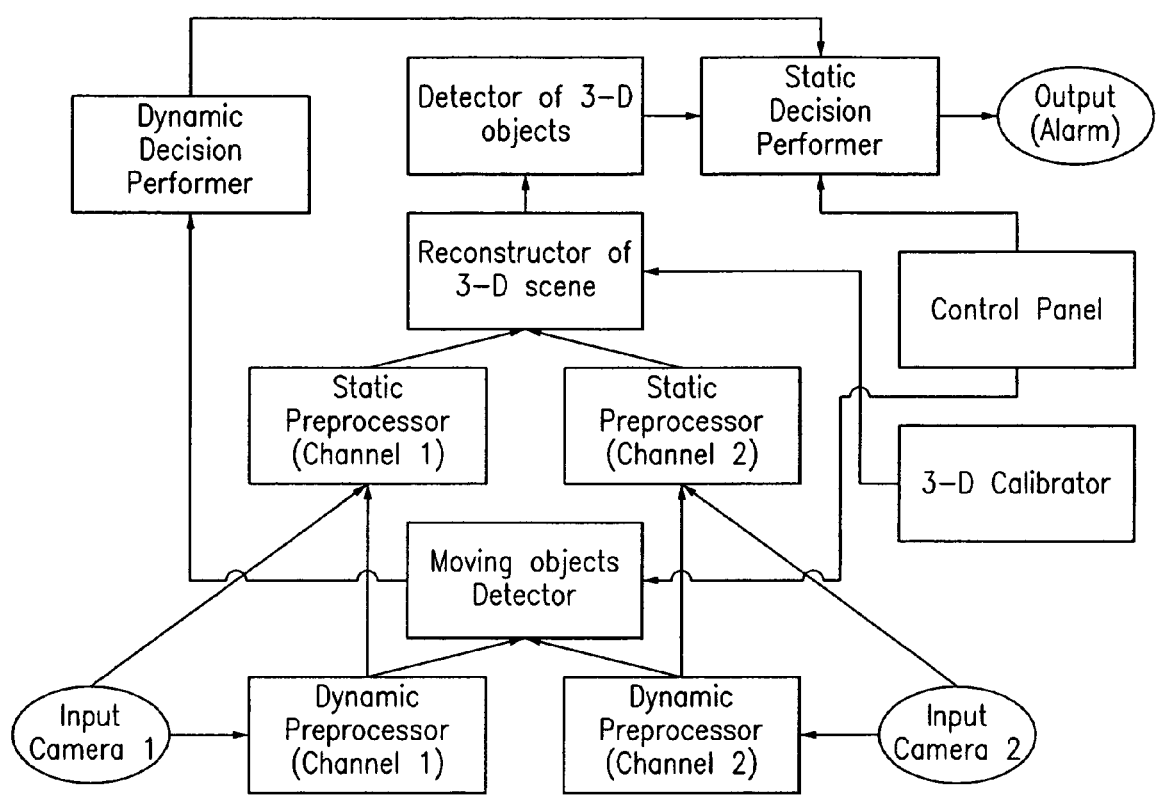
FIG. 2 illustrates an example of stereo intruder detector.

FIG. 2 illustrates an example of stereo intruder detector.

Stereo intruder detector consists of several parts: (a) the device, for example, a stereo camera, and (b) processors. Processors, for example, digital signal processors, are performing analysis and processing of transmitted stereo images from the device, for example, stereo camera. This processing contains different transforms that processors, for example, digital signal processors, are performing with transmitted signal.

According to the embodiments of the present invention that are presented on FIG. 2, processors, for example, digital signal processors, contain several blocks of processing, that differs from other stereo intruder detection systems and contain: (a) Dynamic Preprocessor; (b) Moving objects detector; (c) Dynamic Decision Performer; (d) Static Preprocessor; (e) Reconstructor of 3D scene; (f) Detector of 3D objects; (g) Static Decision Performer; (h) 3D Calibrator; (i) Control Panel; (j) Output alarm signal creator.

According to scheme on FIG. 2, the moving intruder detection (yellow blocks) is performed by fast motion detection processor, for example, digital signal processor. The static intruder detection (blue blocks) is performed by slow motion detection processor for example, digital signal processor.

Figure 3:
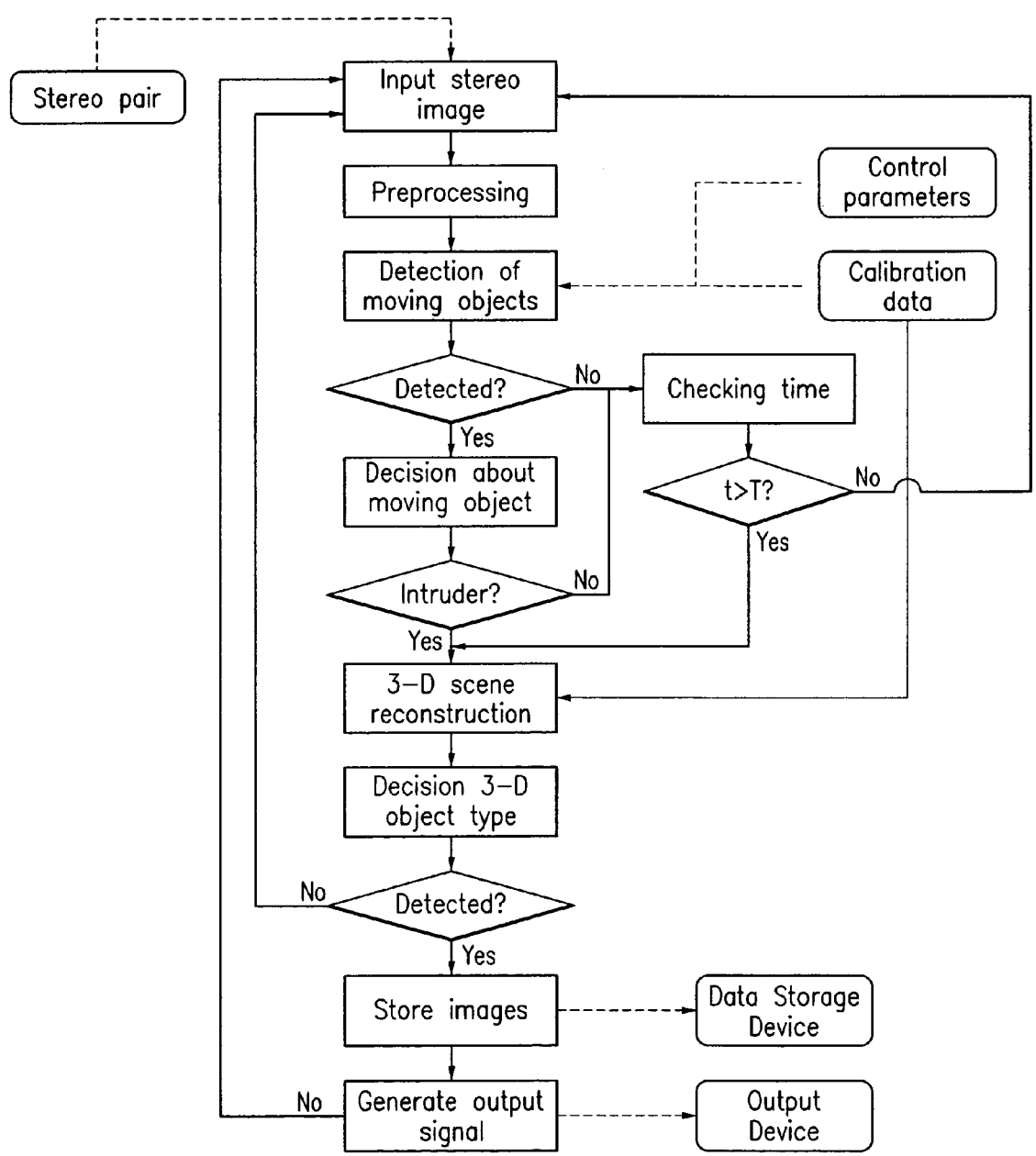
FIG. 3 illustrates an example of the SID method.

FIG. 3 illustrates an example of the SID method.

Stereo intruder detector realizes the method of real time intruder detection. Based on the embodiments of the present invention stereo intruder detector consists of the sensor, for example, stereo camera and processors, for example, digital signal processors. Stereo intruder detector is putted in the surveillance zone according to above mentioned scheme that is presented on FIG. 1. The sensor, for example, stereo camera, observes the surveillance zone and creates and transmits stereo images to processors, for example, digital signal processors. Processors, for example, digital signal processors are performing processing of the transmitted signal according to the above mentioned scheme that is presented on FIG. 2.

In fact, this method consists in the observing of the surveillance zone by the sensor, for example, stereo camera and the work that processors, for example, digital signal processors, are performing with the transmitted signal. This work consists in above mentioned blocks of processing that are presented in FIG. 2. In fact, according to the embodiments of the present invention, processors, for example, digital signal processors are performing these above mentioned blocks of processing.

The example of such kind of transforms that are performed by processors, for example, digital signal processors, is presented on FIG. 3.

According to FIG. 3, there is presented an explanation of example of processing that processors, for example, digital signal processors, are performing with the transmitted signal. Processors, for example, digital signal processors, are performing the processing of the above mentioned transmitted signal that consists in:

(a) Receiving of transmitted stereo images from the sensor and preparing of it for processing.

(b) Preparing that consists in the preprocessing of these stereo images by performance of receiving of data about camera's lenses distortion and optical axes displacement and calculation of all control parameters of the device.

(c) Detecting of moving objects after correction of stereo images in compliance with the data of preprocessing. The detection of moving objects is performed by 2D field of velocities calculation that consists in calculation of the speed of every point of object if it is moving.

(d) The decision making & classification for moving objects by performing that fast motion detection processor, gives an answer if detected object is intruder or not. If it answers that this object is an intruder, it stores the stereo images with detected intruder to memory and creates an alarm signal (to be explained later). If it answers that this object is not an intruder, it performs checking of time if the test time has passed or not. If it has not passed, fast motion detection processor repeats the processing.

(e) Detecting of static objects in the surveillance zone. The detection of static objects is performed by slow motion detection processor by means of the 3D reconstruction of the scene that consists in creation of a map of points from the stereo images that have a correspondence between each other. The fact of the presence of such correspondence is found using calculation of disparity. Disparity is the distance between appropriate camera (left or right) and the point on 3D object (static intruder).

(f) The decision making & classification for static objects by performing that slow motion detection processor gives an answer if detected object is intruder or not. If it answers that detected object is an intruder, it stores stereo images with detected intruder to memory and creates an alarm signal (to be explained later). If it answers that this object is not an intruder, it repeats the processing.

(g) Storage of sequences of stereo images that have the detected intruder occlusions to memory. The total number of stereo images for each sequence is at least 10. This number contains 2 pre-images (before entrance of surveillance zone by intruder), 1 detected stereo image with entering intruder and 7 post-images (after detection).

(h) Performance of the output alarm signal if moving or static intruder is detected. Processors create the alarm signal and transmit it to the output device that reproduces it.

Figure 4:
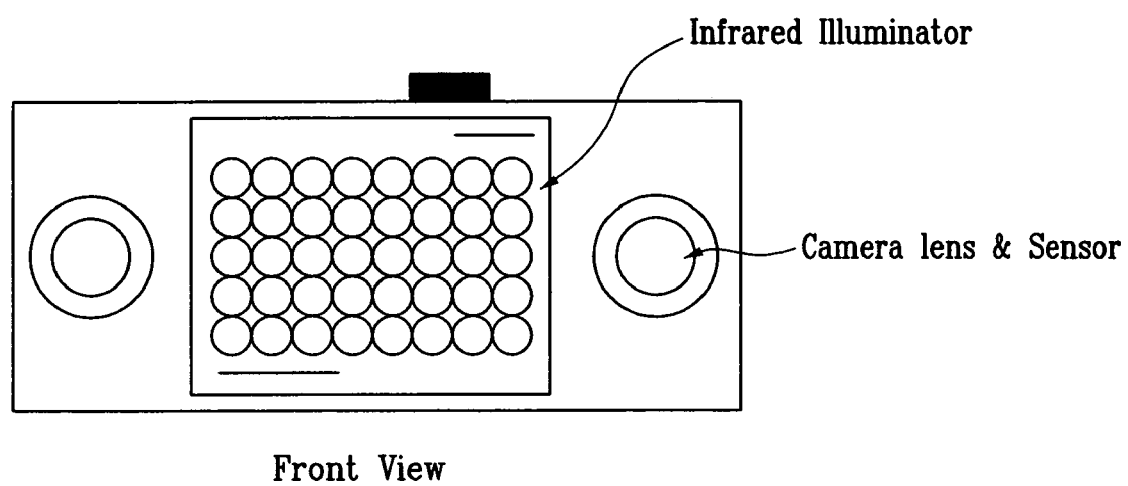
FIG. 4 illustrates one example of stereo camera.

FIG. 4 illustrates one example of stereo camera.

The device presented at FIG. 4 is, for example, a stereo camera, that contains two video cameras, infrared illuminator, for example, light emitting diodes (LED) array, and 2D matrix of photo detectors, for example, CMOS sensor. These video cameras are observing the surveillance zone and creating stereo images that are converted into NTSC signals by 2D matrix of photo detectors, for example, CMOS sensor, and merged into one and transmitted to the processors, for example, digital signal processors. Infrared illuminator, for example, LED array, is performing the illumination of the surveillance zone to obtain high quality stereo images by the device, for example, stereo camera, if the illumination conditions don't have enough light.

The industrial applicability of stereo intruder detector can be various because of its properties and design. Today's high level of demands of security gives a possibility to use the SID in the area of protection of offices, banks, shops, private houses, industrial buildings and other enclosed space areas from intrusion.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Stereo intruder detector is a system for detection of intruder in the surveillance zone. The detector includes the sensor, for example, stereo camera, the processor, for example, digital signal processor and software for intruder's detection. The device, for example, stereo camera, observes the surveillance zone and video streams are processed by the processor, for example, digital signal processor. To work under dark environment the system includes the illuminator, for example, LED array. The system works in real time scale. The algorithm for detecting of intruder is based on two parts: moving intruder detection and static intruder detection. Also it includes parts of the calibration of the sensor, for example, stereo camera, to correct the lenses distortion and decision making subsystem to make a conclusion if the detected object is intruder or not. If intruder is detected, an alarm is sounded and the result is saved to memory.

As described in Prior Art Analysis, most of intruder detection systems have serious limits in usage, low performance of processing, and narrow spectral bandwidth. In contrast to these systems our stereo intruder detector satisfies next conditions: (a) it has various possibilities of usage; (b) it performs processing with high performance for work in real time scale; (c) it has wide spectral bandwidth for work in different conditions of illumination.

Thus, usage of stereo intruder detector described above results in wide possibilities of usage of mentioned above system in various conditions because of small geometrical size and possibilities to put in any place of surveillance zone.

Thus, usage of stereo intruder detector that consists of stereo camera that can observe the surveillance zone and can create image data from all points of its view field simultaneously, and that consists of digital signal processor that can perform processing of the transmitted image data created by stereo camera with high performance results in working of mentioned above system in real time.

Same, usage of stereo intruder detector that consists of digital signal processor that performs a correction of errors of image signal and that consists of stereo camera that is transmitting this image signal results in high performance and improvement of noise filtering.

Thus, usage of stereo intruder detector that consists of stereo camera that can create image data from the surveillance zone and that consists of light emitting diodes array that can illuminate the surveillance zone if there are not enough light in it results in possibilities of its usage in any conditions of illumination that is correspondent to the wide spectral bandwidth.

So stereo intruder detector is a high performance device that can detect presence of intruder in the surveillance zone with high speed and low false detection rate in a real time scale at any illumination conditions.

What is claimed is:

1. A method of intruder detection, comprising
using more than one sensor, represented by cameras that are arranged with fixed spatial orientation to form a stereo detector of 2D distributions of light intensity of a surveillance zone, that form stereo images registered by said stereo detector, and
transmitting the stereo images to processing blocks, for performing processing of a sequence of stereo images with different frequencies, (high and low), for determining the presence of an intruder, a position of said intruder and a speed of transference of said intruder; the determining of an intruder including comparing geometrical figures with a set of geometrical figures that were memorized in advance that describe both resolved objects and a possible intruder, and the scaling of a figure in dependence of a measured distance between the stereo detector and the object that is represented by given figure and generating an alarm signal in case of coincidence with figure of possible intruder.

2. A method as defined in claim 1 wherein the processing includes the comparison of 2 or more consecutive images that are entering the processing block with high frequency, for detection of a fast moving intruder.

3. A method as defined in claim 1 wherein the processing includes measurement of 3D relief in the view field of the stereo detector, for detection of a slow moving or static intruder.

4. A method as defined in claim 1 wherein the processing includes measurement of 3D relief by the processor of detection of a static intruder in the case of detection of possible intruder by the processor of detection of a moving intruder.

5. A method as defined in claim 1 wherein the processing includes determining a local measure of difference of elements that are visible on a stereo image, and memorizing elements of the stereo image when the measured local value is more than a predetermined one in a storage device, while comparing 2 or more consequent images in the processor of detection of a moving intruder.

6. A method as defined in claim 5 wherein the processing includes performing integration of closely set elements of stereo image into geometrical figures that are stored to the storage device.

7. A method as defined in claim 6 wherein the processing includes determining a distance from stereo camera and a geometrical size for every geometrical figure, taking into account of a fixed positional relationship of sensors.

8. A method of intruder detection, comprising
using more than one sensor, represented by cameras that are arranged with fixed spatial orientation to form a stereo detector of 2D distributions of light intensity of a surveillance zone, that form stereo images registered by said stereo detector, and
transmitting the stereo images to processing blocks, for performing processing of a sequence of stereo images with different frequencies, high and low, for determining the presence of an intruder, a position of said intruder and a speed of transference of said intruder;
searching of correspondent points in stereo image in the processor of detection of static intruder for measurement of 3D relief as in view field of stereo camera, after that determining the distance up to the elements of relief that are presented on stereo image using the known fixed positional relationship of the sensors.

9. A method as defined in claim 8 wherein the processing includes memorization of 3D relief of scene thereto memorize a series of a predetermined number of stereo images of the surveillance zone in absence of possible intruders, performing measurement of distances up to elements that are presented on the stereo image averaging the measured distances on the series of stereo images and memorizing the obtained relief in the storage device.

10. A method of intruder detection, comprising
using more than one sensor, represented by cameras that are arranged with fixed spatial orientation to form a stereo detector of 2D distributions of light intensity of a surveillance zone, that form stereo images registered by said stereo detector, and transmitting the stereo images to processing blocks, for performing processing of a sequence of stereo images with different frequencies, high and low, for determining the presence of an intruder, a position of said intruder and a speed of transference of said intruder; performing a comparison of 3D relief that was measured element wise with a relief that was measured in advance in absence of an intruder and memorized in a storage device in the processor for the detection of a static intruder, and memorizing elements of relief for whose the distinction differs from visible elements of relief that are saved to memory on a value that is more than predetermined one, as a result of comparison.

11. A method as defined in claim 10 wherein the processing includes performing the integration of closely set elements of stereo image that are saved to memory of the device into the geometrical figures.

12. A method as defined in claim 9 wherein the processing includes performing the comparison of parameters of geometrical figures that are distinguished with corresponding geometrical parameters of human body that are known in advance, and thereby making a decision about the appearance of intruder.

13. A method as defined in claim 12 wherein the processing includes performing an initial calibration that consists of saving to memory of series of stereo images of an object with known geometrical characteristics, measuring of corresponding geometrical characteristics, comparing the measured characteristics with known ones and determining of corresponding corrections used to perform the calibration again in the case of change of positional relationship of sensors of stereo detector.

14. A device for intruder detection that includes more than one signal sensor, signal processor and executive block that differs in that they install coupled video cameras as a signal sensor, the dynamic signal preprocessor that is extra inserted into the processor whose input is connected to output of the first sensor, and output is connected to input of extra inserted moving object detector and input of extra inserted first static preprocessor, at the same time the second input of the moving objects detector is connected to output of the second dynamic signal preprocessor whose input is connected to output of the second sensor whose second output is connected to input of second static preprocessor whose second input is connected to second output of second dynamic preprocessor and the third input of moving objects detector is connected to the output of control panel whose second output is connected to the first input of static decision performer whose second input is connected to output of dynamic decision performer whose input is connected to output of moving objects detector at that outputs of first and second static preprocessors are connected to the first input of extra inserted reconstructor of 3D scene whose second input is connected to extra inserted 3D objects calibrator and output is connected to extra inserted 3D objects detector whose output is connected to the third input of static decision performer whose output is connected to executive device of alarm signal creation.

* * * * *